United States Patent

[11] 3,614,128

[72] Inventor William J. Sobkow
 Livonia, Mich.
[21] Appl. No. 861,853
[22] Filed Sept. 29, 1969
[45] Patented Oct. 19, 1971
[73] Assignee Ford Motor Company
 Dearborn, Mich.

[54] STATIC AIR BAG RESTRAINT DEVICE
 6 Claims, 6 Drawing Figs.
[52] U.S. Cl. .................................................. 280/150 AB,
 180/90
[51] Int. Cl. ....................................................... B60r 21/08
[50] Field of Search.......................................... 280/150
 AB, 150 B; 180/90; 296/70, 84 K; 244/121; 52/2

[56] References Cited
 UNITED STATES PATENTS
 2,418,798 4/1947 Whitmer ...................... 244/121
 3,130,807 4/1964 McHenry .................... 280/150 AB X
 3,224,924 12/1965 Von Ardenne et al........ 180/90 X
 3,341,248 9/1967 Barenyi et al................. 180/90 X
 3,468,556 9/1969 Smith............................ 180/150 B FOREIGN PATENTS
 618,775 3/1961 Italy ............................. 180/90

Primary Examiner—Benjamin Hersh
Assistant Examiner—John A. Pekar
Attorneys—John R. Faulkner and E. Dennis O'Connor ABSTRACT: A motor vehicle passenger restraint device including a static air bag mounted within the vehicle passenger compartment forward of a seated passenger. The air bag is adapted to be impacted by and limit the forward movement of the passenger during periods of rapid vehicle deceleration. The air bag normally is inflated at atmospheric pressure and is given shape by resiliently deformable, open cell foam located within the bag. Also, the air bag normally is located vertically so that it does not interfere with the line of sight of the passenger through the vehicle windows. A first embodiment of air bag is dimensioned and is sufficiently deformable so that following an initial impact thereupon by the knees of the passenger, a portion of the bag is deformed upwardly to a position forward of the face of the passenger. According to a second embodiment of the invention, the air bag pivotally is secured to vehicle body structure near the top surface of the bag so that an initial impact upon the bag by the knees of the passenger will cause pivotal movement of the bag to a position forward of the face of the passenger.

PATENTED OCT 19 1971 3,614,128

INVENTOR.
William J. Sobkow
BY John R. Faulkner
E. Dennis Genno
ATTORNEYS

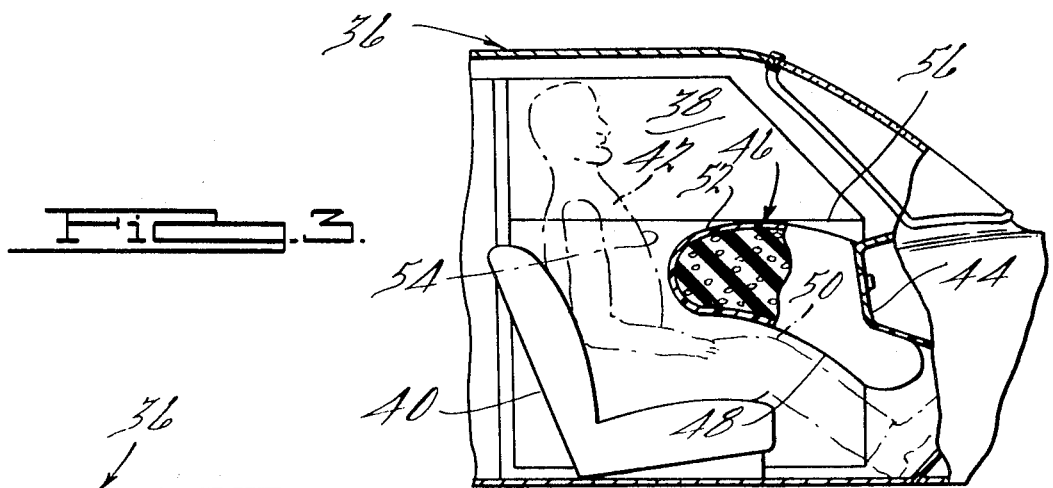
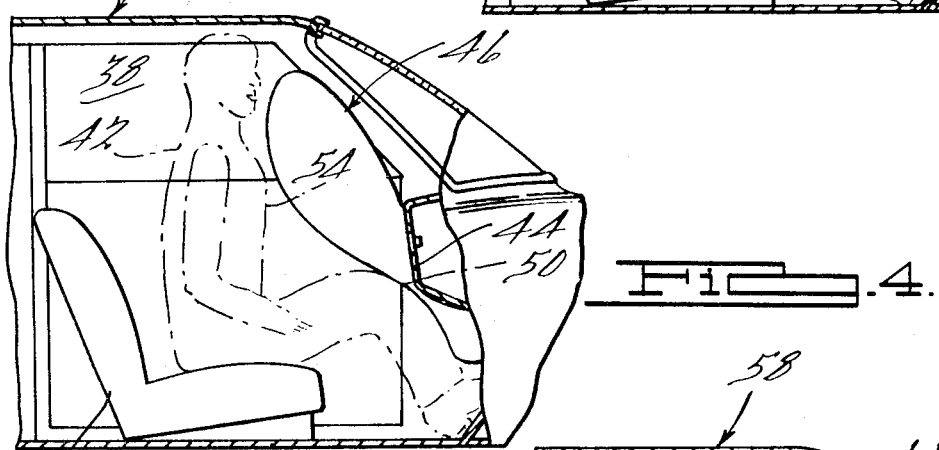
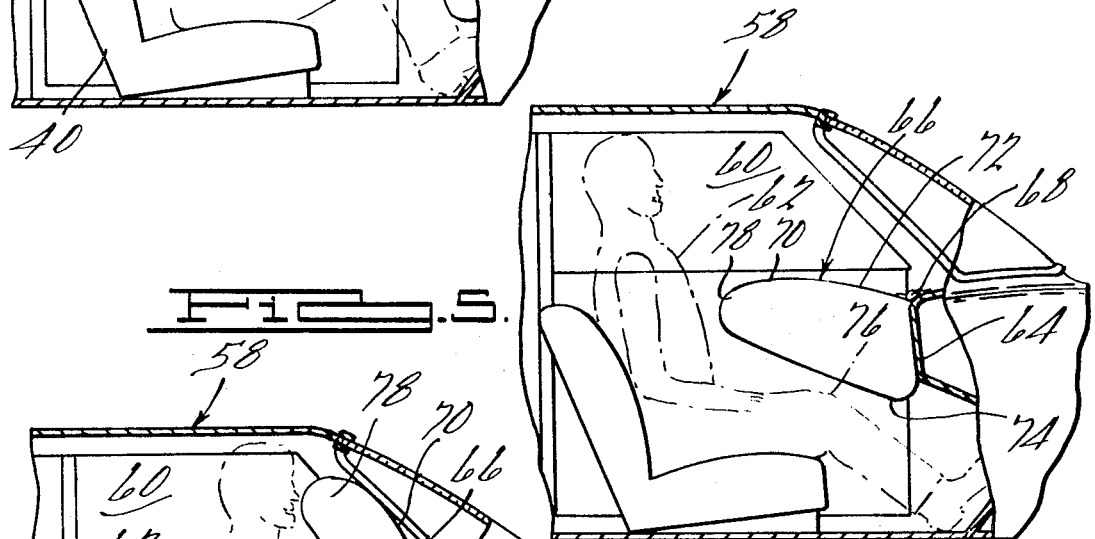
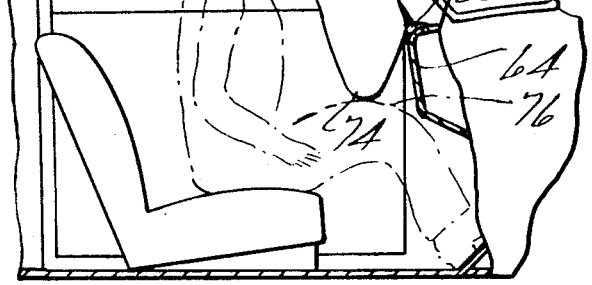

STATIC AIR BAG RESTRAINT DEVICE

BACKGROUND OF THE INVENTION

The prior art details the use of so-called " passenger restraint systems, so termed because these systems are operative to restrain movement of a vehicle passenger without the necessity of the passenger previously having performed a task of any type. Such a restraint system is the static air bag that normally is inflated at atmospheric or slightly higher pressure and is within a vehicle passenger compartment forward of a front facing, seated passenger. Such static air bags may be styled to be aesthetically pleasing and to appear as part of the vehicle interior trim.

An object of this invention is to provide a particular static air bag restraint device of simple and reliable design that is feasible economically to manufacture and assemble within motor vehicles constructed according to high volume production techniques. The air bag of this invention is designed to be positioned normally in a vehicle passenger compartment below the lime of sight of a seated passenger through the vehicle windows, and to be responsive to movement of the passenger during periods of rapid vehicle deceleration and assume position wherein a portion of the air big is positioned forward of the face of the passenger.

DESCRIPTION OF THE DRAWINGS

FIG. 3 is a view similar to FIG. 1, but illustrating a motor vehicle passenger compartment including a second embodiment of the restraint device of this invention FIG. 4 is a view similar to FIG. 3, but showing the restraint device of FIG. 3 being impacted by a vehicle passenger;

FIG. 5 is a view similar to FIG. 1, but showing a motor vehicle passenger compartment including a third embodiment of static air bag restraint device according to this invention; and FIG. 6 is a view similar to FIG. 5, but showing the restraint device of FIG. 5 being impacted by a vehicle passenger.

DETAILED DESCRIPTION OF THE INVENTION

Figure 1:
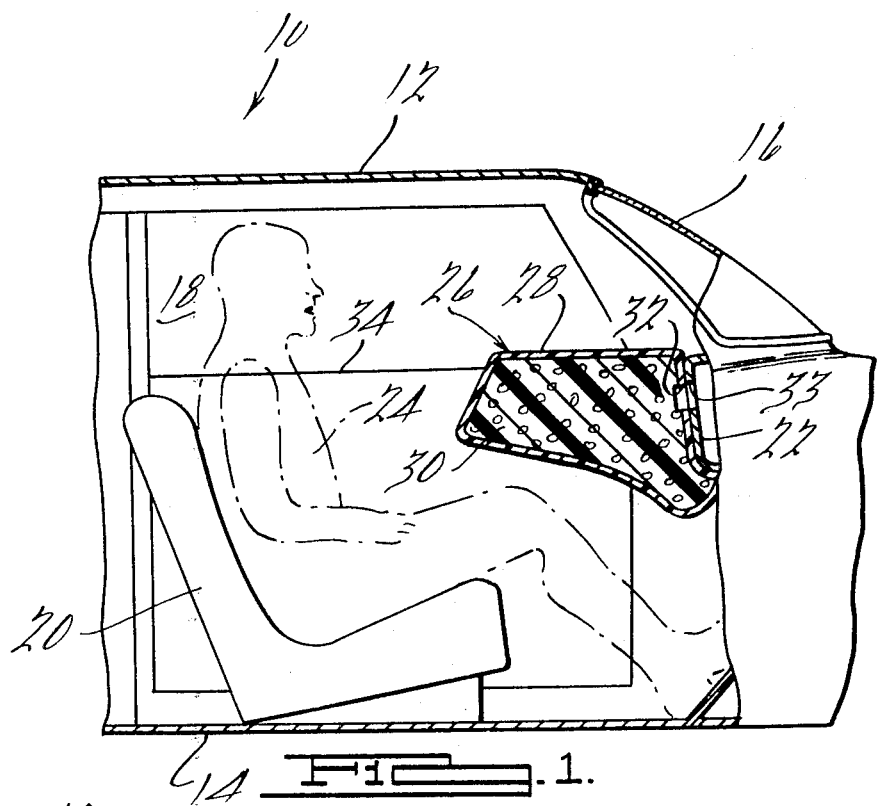
FIG. 1 is a side elevation view, with parts broken away and parts in section, of a motor vehicle passenger compartment including a static air bag restraint device according to this invention.
Figure 2:
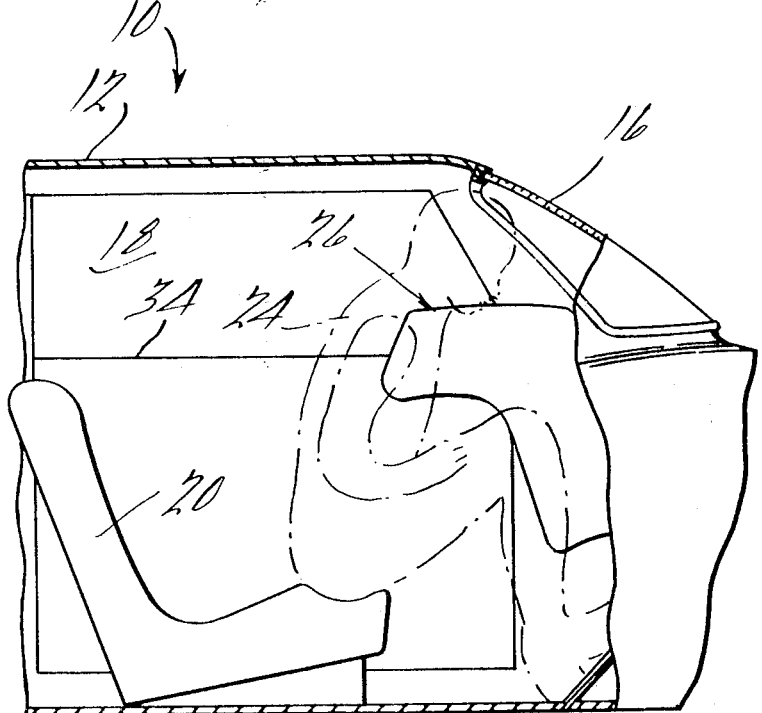
FIG. 2 is a view of the passenger compartment of FIG. 1 illustrating the static air bag restraint device of this invention being impacted by a vehicle passenger.

Referring now in detail to the drawings and in particular to FIGS. 1 and 2 thereof, the numeral 10 denotes generally a motor vehicle having body structure including a roof 12, floor 14 and windshield 16 cooperating to define a passenger compartment 18. A forward facing passenger seat 20 is secured within the passenger compartment 18 to floor 14. Forward of the seat 20 is positioned an instrument panel 22 that may be constructed of sheet metal or the like. A passenger 24 is illustrated as supported on seat 20.

An air bag 26 is secured forward of passenger 24 to instrument panel 22 as by bonding with adhesive or any other suitable method. The air bag 26 has an outer, flexible skin 28 constructed of material that is impervious and will not support its own weight. Shape and form is given to the air bay 26 by foam 30 that is surrounded by the outer skin 28. This foam is of the open cell type and is resiliently deformable. A satisfactory foam has been found to be urethane foam. Preferably, this foam should have a porosity of 90 percent or greater for reasons to be explained below.

The air bag 26 preferably is inflated during normal vehicle operation at atmospheric pressure. Communication between the interior of the air bag 26 and the atmosphere is provided by a restricted orifice 32 in outer skin 28. Orifice 32 registers with an opening 33 formed in the instrument panel 22. It should be noted that air bag 26 may be inflated to slightly greater than atmospheric pressure. If this is the case, orifice 32 is replaced with a suitable valve allowing the inflation of the air bag and allowing pressure relief of the air bag if the pressure within the bag exceeds a predetermined value. This pressure value could be determined empirically depending on the particular use of the air bag that is desired.

As may be seen from FIG. 1, the air bag 26 is positioned within the passenger compartment 18 such that the top surface of the air bag does not exceed greatly the height of the belt line 34 of the vehicle. This belt line is defined as the height of the bottom of the widow areas of the vehicle. This positioning of the air bag provides that the air bag does not interfere with the line of sight of passenger 24 as the passenger observes events exterior of the vehicle through the vehicle windows. Also, this positioning of the air bag 26 allows the air bag to have a stylized and aesthetically pleasing shape and to appear as an integral part of the trim of the passenger compartment 18.

As may be seen from FIG. 2 of the drawings, during periods of rapid vehicle deceleration as occurs during a vehicle collision, passenger 24 moves generally forward out of the normal seated position. As the passenger 24 moves forward, the passenger's knees move forward and upwardly and into contact with the air bag 26. The impact of the knees and air bag is followed by a subsequent impact between the upper torso of the passenger and the upper portion of the air bag 26. Deformation of the air bag results from these impacts and the absorption of impact energy is provided due to the energy required to push the gas within the outer skin 28 between the open cells of the foam 30 and through the restricted orifice 32. Air will flow, or course, from within the air bag 26 through the restricted orifice 32 due to the pressurization of the air within the bag when the bag is deformed due to impact of the passenger thereupon. The deformation of the resiliently deformable foam 30 is insignificant in computing the energy absorbed by the bag 26. The high porosity of this foam provides that its deformation requires only an insignificant amount of energy. The resilience of the foam, however, provides that the bag 26 will resume its original configuration following the impact between the various portions of the body of passenger 24 and the bag.

FIGS. 3 and 4 of the drawing illustrate a modification of the static air bag restraint device of FIG. 1 that especially is useful in motor vehicles having a passenger compartment of somewhat limited size. This is because the modification of FIGS. 3 and 4 positively prevents the head and face area of the vehicle passenger from impacting against the vehicle windshield or other structure.

In FIG. 3, the numeral 36 denotes generally a vehicle having a passenger compartment 38 in which is mounted a forward facing seat 40 adapted to support a passenger 42 in a seated position. Forward of the passenger 42 and secured to an instrument panel 44 is a static air bag 46. The bag 46 is identical in construction to the air bag 26 of FIGS. 1 and 2, except that bag 46 has a unique configuration. The air bag 46 has a lower portion 48 located forward of the knees 50 of passenger 42. The upper portion 52 of bag 46 generally lies forward of the torso and lower chest of the passenger 42 and does not extend above the belt line 56 of the vehicle 36.

During periods of rapid vehicle deceleration, passenger 42 moves forward such that the knees 50 project upwardly and forward into portion 48 of air bag 46. Air bag 46 is sufficiently flexible so that the resultant deformation of bag portion 48 causes bag portion 52 to be forced upwardly into the position illustrated in FIG. 4 wherein it lies forward of the face of the passenger 42. The impact between the face of the passenger and the air bag portion 52 will, of course, be subsequent to the knees 50 contacting bag portion 48. Thus, bag portion 52 will assume the desired position forward of the face of the passenger prior to impact between the upper portions of the passenger and the bag.

Another modification of the static air bag restraint device of this invention may be seen in FIGS. 5 and 6 of the drawings. The modifications of FIGS. 5 and 6 also is useful to positively prevent an impact between the head and face of a vehicle passenger and the vehicle windshield.

In FIGS. 5 and 6, the numeral 58 denotes generally a motor vehicle having a passenger compartment 60 in which a passenger 62 is seated. Forward of the passenger 62 is an instrument panel 64 to which is attached a static air bag 66 that may be similar in shape to the air bag 26 of FIGS. 1 and 2.

The connection between air bag 66 and instrument panel 64 is a pivotal connection with the pivot axis being denoted by the reference numeral 68 and extending perpendicularly into the plane of the drawing. It should be noted that this pivot axis lies at approximately the same level as the top surface 70 of bag 66, which top surface normally is located below the belt line 72 of the vehicle.

Air bag 66 is constructed of material that is somewhat rigid as compared to flexible skin 28 of air bag 26 of FIGS. 1 and 2. This rigidity of the material of the air bag 66 still is deformed when subjected to severe impacts.

As may be seen from FIG. 6 of the drawing, during periods of rapid deceleration, the vehicle passenger 62 moves forward and the knees 76 of this passenger move forward and upwardly into contact with portion 74 of air bag 66, which portion normally is located forward of the knees 76. The contact between the knees 76 and the air bag portion 74 causes a rotation of the air bag in a clockwise direction as viewed in the drawing about the pivot axis 68. This rotation causes air bag portion 78, normally located most distant from instrument panel 64, to assume the position illustrated in FIG. 6 in front of the face of the passenger 62. With air bag 66 in the position illustrated in FIG. 6, it readily may be appreciated that the possibility of the face and head of the passenger impacting the vehicle windshield is excluded.

It thus may be seen that this invention provides a static air bag restraint device including an air bag of a particular construction having a simple and reliable design and that easily may be included in motor vehicles assembled under modern manufacturing techniques. The static air bag restraint device of this invention includes embodiments particularly useful to exclude positively the possibility of the face and head of a motor vehicle passenger impacting the vehicle windshield or other structure during periods of rapid vehicle deceleration as occur during vehicle collisions.

I claim:

1. A restraint device for inclusion in a motor vehicle having body structure defining a passenger compartment and a forward facing passenger seat located within said compartment, said device adapted to restrain movement of a seated passenger during rapid vehicle deceleration and including an air bag normally inflated by a gas to a predetermined pressure, said air bag being formed from a flexible impervious material, said air bag being positioned normally within said passenger compartment such that a first portion of said air bag lies generally forward of the knees of a seated passenger and a second portion of said said air bag lies generally forward of the torso and below the height of the face of said passenger, said second portion extending generally rearwardly of said first portion when said air bag is in an installed position, and said bag being sufficiently deformable that upon said first portion being impacted and deformed by the knees of the passenger during vehicle deceleration said second air bag portion is forced upwardly to a position forward of the face of the passenger.

2. The restraint device of claim 1, wherein said predetermined pressure is atmospheric pressure and said air bag is vented to the atmosphere by means of at least one restricted orifice.

3. The restraint device of claim 1, wherein the said air bag material is held in its normal shape by resiliently deformable open cell foam located within said air bag, said foam having a porosity of at least 90 percent.

4. A restraint device for inclusion in a motor vehicle having body structure defining a passenger compartment and a forward facing passenger seat located within said compartment, said device adapted to restrain movement of a seated passenger during rapid vehicle deceleration and including an air bag normally inflated by a gas to a predetermined pressure, said air bat being formed from a flexible impervious material, said air bag being pivotally secured to said body structure along a pivot axis extending transversely across said vehicle, said air bag being normally positioned so that a first air bag portion lies generally forward of the knees of a seated passenger and a second air bag portion lies generally forward of the torso and below the height of the face of said passenger said said second portion extending generally rearwardly of said first portion when said air bag is in an installed position, and said air moving pivotally about said axis to a position wherein said second portion lies generally forward of the face of said passenger upon said first portion being impacted by the knees of said passenger during rapid vehicle deceleration.

5. The restraint device of claim 4, wherein said predetermined pressure is atmospheric pressure.

6. The restraint device of claim 4, wherein said pivot axis is located along said second air bag portion.